United States Patent Office 3,325,519
Patented June 13, 1967

3,325,519
PROCESS FOR THE PREPARATION OF EQUILIN AND INTERMEDIATES OBTAINED THEREFROM
Gunther Krüger, St. Laurent, Quebec, Canada, assignor to American Home Products Corporation, New York, N.Y., a corporation of Delaware
No Drawing. Filed Mar. 17, 1965, Ser. No. 440,597
25 Claims. (Cl. 260—397.4)

This invention relates to the preparation of equilin, a highly potent, naturally occurring estrogen, and to novel intermediates in the preparation thereof. The valuable biological properties of equilin are well known and are utilized in medicine. The intermediates are not only useful in the synthesis of equilin, but are also useful by themselves, having uterotrophic, antigonadotrophic and cholesterol lowering properties.

My invention resides, more particularly, in a new and improved synthesis of this estrogenic hormone. The new and improved method of preparation, herein disclosed, starts with readily available starting materials, and has the especial advantage that undesirable side reactions are substantially absent. This avoidance of undesirable side reactions, which is a characteristic of my novel synthesis, eliminates the necessity for extensive purification of products during the manufacturing process, and results in very high yields, thus making the process commercially attractive. Purification of both intermediates and final products secured, such as by chromatography or other purification procedures, is required in presently-available methods for the preparation of this estrogenic material, the necessity for such purification, however, being avoided to a very considerable degree in my improved synthesis.

For example, in one presently known procedure for the preparation of equilin, in which the difficulty accessible compound 6-dehydro-19-nortestosterone is utilized as starting material, the synthesis includes a microbiological aromatization step which is both expensive and difficult to carry out and which results only in impure products. As a consequence the final product, as prepared in accordance with this known procedure, must be subjected to a laborious purification before it can be used. In connection with another known method, wherein a more readily available starting material is employed, not only must the final product be purified extensively, but the products obtained as a result of the intermediate steps of the synthesis must also be purified. All this expensive and time-consuming purification is avoided, substantially completely, by the improved synthesis of this estrogenic hormone which is herein disclosed.

Described generally, my new and improved method for preparing equilin includes the three following steps.

(1) A basically catalysed deconjugation of a steroidal 4,6-dien-3-on-19-ol (Ia) or its 19-acylates (Ib) which hydrolyse in the deconjugation procedure, to obtain the corresponding 5,7-dien-3-on-19-ol (II), a new compound, which may be readily isolated and subsequently rearranged with a suitable acid to the desired 4,7-dien-3-on-19-ol (III); alternatively, the above 5,7-dien-3-on-19-ol (II) may be converted without isolation to the desired 4,7-dien-3-on-19-ol (III).

(2) Treatment of the above 4,7-dien-3-on-19-ol (III) with a lead tetraacylate, for example, lead tetraacetate, or lead tetrabenzoate, thereby obtaining the new 10-acyl-oxyestra-4,7-diene-3,17-dione (IV), for example 10-acetoxyestra-4,7-diene-3,17-dione (IV).

(3) Conversion of 10-acyloxyestra-4,7-diene-3,17-dione (IV), for example 10-acetoxyestra-4,7-diene-3,17-dione (IV), to equilin by pyrolysis, this novel step proceeding smoothly and without difficulty; or conversion by treatment with acids, or bases, or by photolysis, or by catalytic elimination of acid with lithium salts in dimethylformamide.

It is particularly surprising and unexpected that the isolated double bond in position 7–8 may be introduced, shifting this bond from the conjugated 6–7 position by simple treatment with a base, and that the deconjugation may be effected with bases as moderate as potassium hydroxide, and that it remains in the 7–8 position entirely unaffected by subsequent reactions carried out in connection with the synthesis.

It is surprising also, that the crude steroidal 5,7-dien-3-on-19-ol (II) isolated from the reaction mixture is free from any appreciable contamination with the corresponding 4,6-diene (I) and that it may be further rearranged in almost quantitative yields by treatment with a suitable acid to the desired crude crystalline 4,7-dien-3-on-19-ol (III).

It is further surprising that in addition to the stability of the double bond in position 7 the introduction of unsaturation in the last step may be directed almost exclusively to ring A rather than to ring B of the steroid.

Other advantages and distinctive features of my new process may be summarized as follows.

The easy availability of the starting material is a distinct advantage of my improved process for preparing equilin. I prefer to use androst-4,6-diene-3,17-dion-19-ol (Ia) as the starting material. This latter compound is readily available from dehydroisoandrosterone by a modification of the method which was first described by Heusler et al. in Experientia, vol. 18, page 464 (1962).

While the deconjugation of similar steroidal 4,6-dien-3-ones has been previously described, the known methods of deconjugation have several disadvantages. The most serious of these is that the desired deconjugated steroidal 4,7-dien-3-one is invariably contaminated with the steroidal 4,6-dien-3-one which results therefrom by reconjugation. Separation of these two compounds is difficult and laborious.

It is an especial advantage of my improved process that substantially no such reconjugation takes place during the synthesis, and that the crude crystalline steroidal 4,7-dien-3-on-19-ol (III) isolated from the reaction mixture is free from the corresponding 4,6-diene.

A further advantage of my improved process results in the fact that it permits obtaining a steroidal 4,7-dien-3-on-19-ol from the corresponding 4,6-diene, without first having to prepare and isolate an intermediate 3-enol derivative as is necessary when following known procedures for the preparation of this estrogenic hormone.

In one presently available method for preparing equilin the intermediate 3-enol derivative may only be prepared in the form of its 19-acylate, for example 3,19-diacetoxy-androsta-3,5,7-trien-17-one, which yields, under carefully chosen conditions of mild hydrolysis, 19-acetoxyandrosta-4,7-diene-3,17-dione, contaminated with the isomeric 4,6-diene. Sometimes the product of the reaction may also contain small amounts of androsta-4,7-diene-3,17-dion-19-ol.

A particular disadavtange of the above process is the fact that the 19-acetoxy group of the 4,7-diene may not be hydrolysed without extensive reconjugation to the corresponding 4,6-diene, so that the above process is not a practical means for the preparation of androsta-4,7-diene-3,17-dion-19-ol.

By the selection of special conditions, such as by the use of an excess of basic reagents and appropriate reaction times, my synthesis permits the obtainment of the 5,7-dien-3-on-19-ol (II) and the 4,7-dien-3-on-19-ol (III) intermediates substantially free from by-products. The 5,7-dien-3-on-19-ol (II) may be isolated from the basic reaction mixture by rendering it slightly acidic with a weak acid, for example acetic acid or basic acid. I have found that it is possible to rearrange this 5,7-dien-3-on-19-ol (II) to the desired 4,7-dien-3-on-19-ol (III) by treating it with a strong acid. I have also found that the basic reaction mixture may be converted directly to the desired 4,7-dien-3-on-19-ol (III) without prior isolation of the 5,7-dien-3-on-19-ol (II) by treatment with an excess of a strong acid, such as, for example, hydrochloric acid, sulfuric acid, or methanesulfonic acid.

In this way, neutralization of the base, as well as rearrangement of the 5,7-dien-3-on-19-ol (II) by means of a strong acid to the 4,7-dien-3-on-19-ol (III) is accomplished in a single step.

In contrast to the rather hydrophilic 4,7-dien-3-on-19-ol (III), the more organophilic 5,7-dien-3-on-19-ol (II) may be readily isolated by extraction of the acidic aqueous reaction mixture with water-immiscible organic solvents, facilitating its separation from water-soluble byproducts and traces of 4,6-dien-3-on-19-ol (Ia) starting material as well as from the dimethyl sulfoxide solvent.

During the course of my improved synthesis the 10-hydroxymethylene group remains available for further reactions leading to its elimination with concomitant formation of the desired product (V). The free 10-hydroxymethylene group in the steroidal 4,7-dien-3-one (III) is smoothly converted to the 10-acyloxy group, which is then easily removed, thereby yielding the desired steroid (V) with an aromatic ring A. As contrasted with known methods of preparation, and as an additional advantage of my process, there is required no intervening chemical or microbiological dehydrogenation step.

More specifically, in accordance with my process, I subject androsta-4,6-diene-3,17-dion-19-ol (Ia) or its 19-acylates (Ib) at room temperature, to the action of a suspension of an alkali metal hydroxide, or a lower alkoxide, or hydride, or amide, in dimethylsulfoxide, preferably for a brief period of time, to obtain an alkaline reaction mixture containing the corresponding enolate. Treatment of the latter with weak acid, for example, acetic acid or boric acid, yields androsta-5,7-diene-3,17-dion-19-ol (II). Either the alkaline reaction mixture obtained as above, or the isolated androsta-5,7-diene-3,17-dion-19-ol (II), is then treated at once with a molar excess of a strong acid, for example, hydrochloric acid, sulfuric acid or methanesulfonic acid, to obtain the desired androsta-4,7-diene-3,17-dion-19-ol (III) in a high state of purity.

This latter compound is then treated preferably at an elevated temperature for a short period of time with a molar excess of a lead tetraacylate, for example, lead tetraacetate in a non-polar solvent. Following removal of lead salts, the desired 10-acyloxyestra-4,7-diene-3,17-dione (IV), for example the 10-acetoxyestra-4,7-diene-3,17-dione (IV) may be isolated by evaporation of the solvent and purified by crystallization. Isolation is not, however, essential, as the crude product may be used unchanged in the subsequent step of the synthesis.

Comparing the structure of equilin with those of its precursors, the 10 - acyloxyestra - 4,7 - diene-3,17-diones (IV), it is evident that the former shows a much greater degree of conjugation and is therefore thermodynamically much more stable than the latter compounds. For that reason the 10 - acyloxyestra - 4,7 - diene-3,17-diones are readily converted to equilin, the elimination of the respective carboxylic acid from the starting materials (IV) being synergetic with aromatization to equilin. Thus, not only a relatively mild activation such as a brief treatment with aqueous bases which would be too mild for the hydrolysis of a simple ester, but also other very diverse means of activation of the 10-acyloxyestra-4,7-diene-3,17-diones, give equilin. Thus, in the final step, equilin is obtained from the 10-acyloxyestra-4,7-diene-3,17-diones by activation through pyrolysis, photolysis, catalysis with lithium salts, or through treatment with strong acids and bases. It is surprising indeed that even when activating by pyrolysis, the isolated double bond in position 7, 8 is substantially not affected and remains in its position.

Activation by pyrolysis, a preferred embodiment of my invention, may optionally be carried out in the presence of inert diluents such as, for example, ethylene glycol, quinoline, or a mineral oil (Nujol). Preferably, 10-acetoxyestra-4,7-diene-3,17-dione (IV) is pyrolytically distilled at a temperature within the range of 200° C. to 600° C., and at reduced pressure, thereby securing substantially pure equilin (V).

Activation by photolysis is preferably carried out in the presence of ultraviolet radiation, preferably in the wavelength range of from 220 mμ to 300 mμ.

By activation with lithium salts catalysed elimination may be effected, for example, by refluxing a 10-acyloxy-estra-4,7-diene-3,17-dione (IV) such as, for example, 10-acetoxyestra - 4,7 - diene-3,17-dione in approximately 10 parts by volume of dimethylformamide containing approximately one part by weight of a lithium salt such as, for example, lithium chloride.

Activation to effect aromatization with strong acids or bases is preferably carried out by treating a 10-acyloxy-estra-4,7-diene-3,17-dione such as, for example, 10-acetoxyestra-4,7-diene-3,17-dione in solution in an inert solvent such as, for example, tetrahydrofuran, with an aqueous mineral acid such as, for example, 50% aqueous sulfuric acid, or by treatment with an alkali metal hydroxide such as, for example, potassium hydroxide, in solution in a lower alkanol. However, in these procedures the formation of a byproduct can not be prevented.

These reactions may be represented as follows:

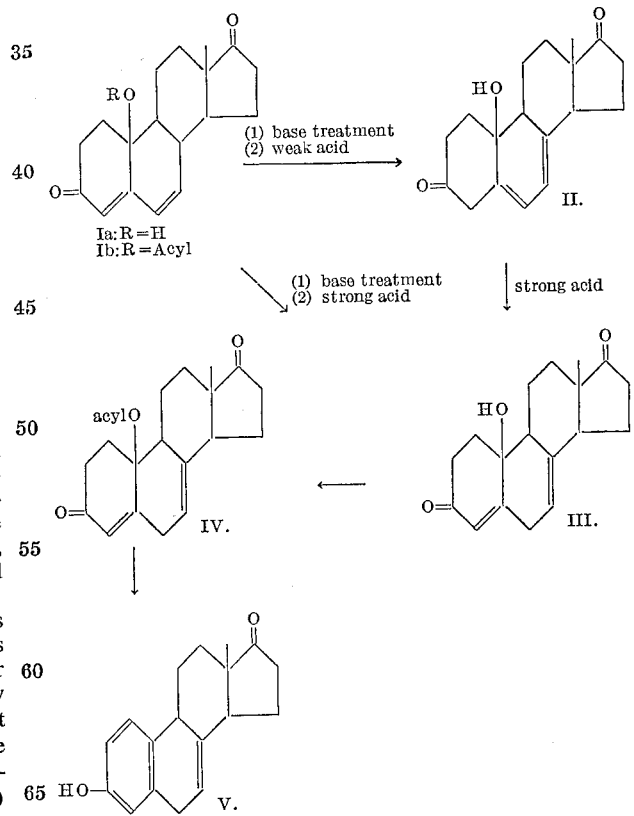

The same sequence of reactions as represented in the above diagram may also be carried out starting with androsta-4,6-dien-3-on-17,19-diol or with a 17-acyloxyandrosta - 4,6 - dien - 3 - on-19-ol; dihydroequilin or its 17-acylates are obtained. The latter acylates may be readily hydrolyzed to dihydroequilin which in turn yields equilin (V) on Oppenauer oxidation.

The following examples are illustrative of my invention.

EXAMPLE 1

Androsta-4,7-diene-3,17-dion-19-ol (III)

Androsta-4,6-diene-3,17-dion-19-ol (Ia) in the amount of 40.0 grams or the same amount of the corresponding 19-acetate (Ib) or 19-propionate (Ib) is dissolved in 40 milliliters of dimethyl sulfoxide and poured at once into a previously prepared suspension of 120 grams of sodium methoxide in 40 milliliters of dimethyl sulfoxide. After short agitation under nitrogen the mixture is poured at once into 4,000 milliliters of ice-cold 2 N aqueous hydrochloric acid.

The reaction mixture is filtered to remove the solid material. The aqueous solution remaining is then extracted three times with ethyl acetate, using 3,000 milliliters of the extractant each time. The ethyl acetate extracts are washed with aqueous sodium bicarbonate until neutral. The dried, filtered solid, as well as the solid material obtained upon evaporation of the ethyl acetate extracts under a reduced pressure, less than atmospheric, are combined and digested with 50 milliliters of acetone.

After filtration there is thus obtained androsta-4,7-diene-3,17-dion-19-ol (III), which is washed with a little ethyl acetate. It has a melting range of 219–233° C.; $\lambda_{max}$ 240 m$\mu$, $\epsilon$ 14400 (1 percent solution in ethanol). In the same manner, but using 2 N sulfuric or 4 N methane sulfonic acid instead of hydrochloric acid, androsta-4,7-diene-3,17-dion-19-ol (III) is also obtained.

EXAMPLE 2

Androsta-4,7-diene-3,17-dion-19-ol (III)

Androsta-4,6-diene-3,17-dion-19-ol (Ia) in the amount of 10 g. is dissolved in 100 ml. of dimethyl sulfoxide and powdered sodium methoxide in the amount of 15 g. is added in one portion. After stirring as in Example 1 the mixture is poured into 500 ml. of 2 N ice-cold aqueous acetic acid. The aqueous mixture is extracted once with 500 ml. and twice with 250 ml. of ethyl acetate. The combined extracts are washed four times with 50 ml. of water and are then shaken vigorously for 10 minutes with 50 ml. of 4 N hydrochloric acid. After separation of the acid phase the organic layer is washed with 50 ml. saturated aqueous sodium bicarbonate and subsequently with 50 ml. of water. Evaporation of the solvent yields a solid material which is dried in vacuo and then digested with a small volume of acetone. Filtration yields androsta-4,7-diene-3,17-dion-19-ol (III), identical with the product described in Example 1.

Under the same reaction conditions as described above the 19-acyloxyandrosta-4,6-diene-3,17-iones such as, for example, the 19-acetate or the 19-propionate, yield also androsta-4,7-diene-3,17-dion-19-ol (III), with concomitant hydrolysis of the 19-acylate groups in the course of the reaction.

EXAMPLE 3

Androsta-5,7-diene-3,17-dion-19-ol (II)

Androsta-4,6-diene-3,17-dion-19-ol (Ia) in the amount of 0.5 g. is dissolved in 5 ml. of dimethyl sulfoxide whereupon a previously prepared suspension of 1.5 g. sodium methoxide in 5 ml. dimethyl sulfoxide is added in one portion. After agitation under nitrogen the mixture is poured into 50 ml. of ice-water mixture containing 2.5 ml. of glacial acetic acid. The mixture is left for two hours 5° C. and then filtered. The androsta-5,7-diene-3,17-dion-19-ol (II) thus collected has a melting range of 80–100° C.; $\lambda_{max}$ (1% solution in ethanol) 263, 282 m$\mu$ with $\epsilon$ 6500 and 6600, respectively. Infrared spectroscopy shows absorption maxima at 1725, 1745 and 3480 cm.$^{-1}$ (in carbon disulphide).

Treatment of an ether or ethyl acetate solution of the above androsta-5,7-diene-3,17-dion-19-ol (II) with 2 N aqueous hydrochloric acid or 2 N sulfuric acid, or 4 N methane sulfonic acid, for 10 minutes at room temperature yields androsta-4,7-diene-3,17-dion-19-ol (III), identical with the compound obtained in Examples 1 and 2.

EXAMPLE 4

10-Acetoxyestra-4,7-diene-3,17-dione (IV)

Androsta-4,7-diene-3,17-dion-19-ol (III) in the amount of 1.0 gram is finely ground and suspended in 60 milliliters of toluene. The mixture is then heated to the boiling point. Lead tetraacetate in the amount of 3.0 grams is then added under an atmosphere of nitrogen. The mixture is boiled for three minutes while being stirred. It is cooled to 50° C., 0.1 gram of decolorizing charcoal ("Nuchar") is added, and stirring is continued. After five minutes of additional stirring, 3.0 milliliters of water is added in order to destroy the excess lead tetraacetate. The mixture is stirred for an additional period of 15 minutes, and filtered to remove solid material.

The filtrate is evaporated at a reduced pressure, less than atmospheric, thereby yielding an oil which crystallizes when treated with 5 milliliters of ether. Filtration, followed by washing the crystalline product with a little ether, yields a solid product which is recrystallized from ether to yield 10-acetoxyestra-4,7-diene-3,17-dione (IV), M.P. 170–175° C. $\lambda_{max}$ 239 m$\mu$; $\epsilon$ 13840 (1 percent solution in ethanol).

EXAMPLE 5

Equilin (V)

10-acetoxyestra-4,7-diene-3,17-dione (IV) obtained as above in the amount of 1.0 gram is pyrolytically distilled at 250° C. bath temperature at a pressure less than atmospheric corresponding to 0.5 millimeters of mercury. The distillate, upon recrystallization from ethyl acetate, yields equilin (V) of melting point 233–236° C., identical with an authentic sample, as established by thin layer chromatography and by comparison of ultra violet and infrared spectra.

EXAMPLE 6

Equilin (V)

10 - acetoxyestra - 4,7 - diene - 3,17 - dione (IV) in the amount of 1 gram, is pyrolyzed at 240° to 250° C. in the presence of 5 milliliters of mineral oil ("Nujol") and in an atmosphere of nitrogen for 20 minutes. Dilution with hexane, followed by filtration and recrystallization from ethyl acetate yields crude equilin (V), which is purified by sublimation or chromatography, and is identical with an authentic sample.

Substituting the mineral oil in the above reaction by ethylene glycol or quinoline, and refluxing for 20 minutes, also yields equilin (V), identical with an authentic sample.

EXAMPLE 7

Equilin (V)

The compound 10-acetoxyestra-4,7-diene-3,17-dione (IV) in the amount of 1.0 gram is refluxed under nitrogen for five minutes in 10 milliliters of dimethylformamide containing 1.0 gram of lithium chloride. The solvent is concentrated under reduced pressure, less than atmospheric, and the residue taken up in methylene chloride. The insoluble inorganic salts are filtered off from the solution, the clear filtrate being then evaporated. Equilin (V) identical with an authentic sample crystallises from the concentrated filtrate and is recovered and purified as above.

EXAMPLE 8

Equilin (V)

10-acetoxyestra-4,7-diene-3,17-dione (IV, 1 g.) dissolved in 10 ml. of tetrahydrofuran is allowed to stand at room temperature with 0.2 ml. of 50% aqueous sulfuric acid for 6 hours. Dilution with water, followed by extraction with methylene chloride and chromatography and crystallization yields equilin (V) identical with an authentic sample.

EXAMPLE 9

Equilin (V)

10-acetoxyestra-4,7-diene-3,17-dione (IV), (1 g.), dissolved in 10 ml. of methanol, 1 ml. of 10% aqeuous potassium hydroxide is added and the mixture is left to stand at room temperature for 5 minutes. Dilution with water, followed by extraction with methylene chloride and chromatography, and recrystallization from ethyl acetate yields equilin, identical with an authentic sample.

EXAMPLE 10

Equilin (V)

10-acetoxyestra-4,7-diene-3,17-dione (IV) dissolved in dioxane at a concentration of 40 mg. per milliliter is irradiated under nitrogen with ultraviolet light, predominantly of wavelength 256 m$\mu$ for 24 hours at room temperature. Dilution with water, extraction with methylene chloride, and evaporation of the solvent followed by chromatography, yields equilin (V) identical with an authentic sample by thin-layer chromatography.

I claim:
1. A process for preparing equilin, which comprises treating a compound selected from the group consisting of androsta-4,6-diene-3,17-dion-19-ol and the 19-acylates thereof with a base selected from the group consisting of the alkali metal lower alkoxides, alkali metal hydroxides, alkali metal hydrides, and alkali metal amides, treating the reaction mixture with weak acid, to obtain androsta-5,7-diene-3,17-dion-19-ol; converting androsta-5,7-diene-3,17-dion-19-ol to androsta-4,7-diene-3,17-dion-19-ol by treatment with strong acid; treating the latter compound with a tetravalent lead acylate to obtain a 10-acyloxyestra-4,7-diene-3,17-dione; eliminating the elements of the respective carboxylic acid from said compound with synergetic aromatization thereby obtaining equilin.

2. A process for preparing equilin, which comprises treating a compound selected from the group consisting of androsta-4,6-diene-3,17-dion-19-ol and the 19-acylates thereof with a base selected from the group consisting of the alkali metal lower alkoxides, alkali metal hydroxides, alkali metal hydrides, and alkali metal amides, treating the reaction mixture with a strong acid, to obtain androsta-4,7-diene-3,17-dion-19-ol; treating the latter compound with a tetravalent lead acylate to obtain a 10-acyloxyestra-4,7-diene-3,17-dione; eliminating the elements of the respective carboxylic acid from said compound with synergetic aromatization thereby obtaining equilin.

3. In a process according to claim 1, the step of treating androsta-5,7-diene-3,17-dion-19-ol with strong acid, to obtain androsta-4,7-diene-3,17-dion-19-ol.

4. A process as defined in claim 1 in which the starting material is androsta-4,6-diene-3,17-dion-19-ol.

5. A process as defined in claim 1 in which the starting material is androsta-4,6-diene-3,17-dion-19-ol acetate.

6. A process as defined in claim 2 in which the starting material is androsta-4,6-diene-3,17-dion-19-ol.

7. A process as defined in claim 2 in which the starting material is androsta-4,6-diene-3,17-dion-19-ol acetate.

8. A process as defined in claim 1 in which the weak acid used for treating the reaction mixture is acetic acid, and the strong acid is hydrochloric acid.

9. A process as defined in claim 2 in which the strong acid used for treating the reaction mixture is hydrochloric acid.

10. A process as defined in claim 1 in which the lead acylate is lead tetraacetate.

11. A process as defined in claim 2 in which the lead acylate is lead tetraacetate.

12. In a process according to claim 1, the step of activating a 10-acyloxyestra-4,7-diene-3,17-dione to eliminate the elements of the respective carboxylic acid with synergetic aromatization to equilin, by pyrolysis.

13. In a process according to claim 2, the step of activating a 10-acyloxyestra-4,7-diene-3,17-dione to eliminate the elements of the respective carboxylic acid with synergetic aromatization to equilin, by pyrolysis.

14. In a process according to claim 1, the step of activating a 10-acyloxyestra-4,7-diene-3,17-dione to eliminate the elements of the respective carboxylic acid with synergetic aromatization to equilin, by pyrolysis in the presence of an inert diluent.

15. In a process according to claim 2, the step of activating a 10-acyloxyestra-4,7-diene-3,17-dione to eliminate the elements of the respective carboxylic acid with synergetic aromatization to equilin, by pyrolysis in the presence of an inert diluent.

16. In a process according to claim 1, the step of activating a 10-acyloxyestra-4,7-diene-3,17-dione to eliminate the elements of the respective carboxylic acid with synergetic aromatization to equilin, by photolysis.

17. In a process according to claim 2, the step of activating a 10-acyloxyestra-4,7-diene-3,17-dione to eliminate the elements of the respective carboxylic acid with synergetic aromatization to equilin, by photolysis.

18. In a process according to claim 1, the step of activating a 10-acyloxyestra-4,7-diene-3,17-dione to eliminate the elements of the respective carboxylic acid with synergetic aromatization to equilin, by catalysis with lithium chloride in dimethyl formamide.

19. In a process according to claim 2, the step of activating a 10-acyloxyestra-4,7-diene-3,17-dione to eliminate the elements of the respective carboxylic acid with synergetic aromatization to equilin, by catalysis with lithium chloride in dimethylformamide.

20. In a process according to claim 1, the step of activating a 10-acyloxyestra-4,7-diene-3,17-dione to eliminate the elements of the respective carboxylic acid with synergetic aromatization to equilin by treatment in tetrahydrofuran with aqueous sulfuric acid.

21. In a process according to claim 2, the step of activating a 10-acyloxyestra-4,7-diene-3,17-dione to eliminate the elements of the respective carboxylic acid with synergetic aromatization to equilin by treatment in tetrahydrofuran with aqueous sulfuric acid.

22. In a process according to claim 1, the step of activating a 10-acyloxyestra-4,7-diene-3,17-dione to eliminate the elements of the respective carboxylic acid with synergetic aromatization to equilin by treatment in methanol with potassium hydroxide.

23. In a process according to claim 2, the step of activating a 10-acyloxyestra-4,7-diene-3,17-dione to eliminate the elements of the respective carboxylic acid with synergetic aromatization to equilin by treatment in methanol with potassium hydroxide.

24. Androsta-5,7-diene-3,17-dion-19-ol.

25. 10-acetoxyestra-4,7-diene-3,17-dione.

References Cited

UNITED STATES PATENTS 3,162,655    12/1964    Bagli _____ 260—397.4

LEWIS GOTTS, Primary Examiner.

ELBERT L. ROBERTS, Examiner.

UNITED STATES PATENT OFFICE
CERTIFICATE OF CORRECTION

Patent No. 3,325,519            June 13, 1967

Gunther Krüger

It is hereby certified that error appears in the above numbered patent requiring correction and that the said Letters Patent should read as corrected below.

Column 4, lines 34 to 43, for that portion of the left-hand formula reading $\overset{RO}{|}$ read $RO\diagdown$ same column 4, lines 34 to 43 and lines 47 to 55, for that portion of formulas II and III reading "HO", each occurrence read -- $HO\diagdown$ --.

Signed and sealed this 26th day of November 1968.

(SEAL)
Attest:

Edward M. Fletcher, Jr.           EDWARD J. BRENNER
Attesting Officer          Commissioner of Patents